3,047,644
PROPYLENE POLYMERIZATION PROCESS

Charles N. Winnick, Great Neck, N.Y., assignor to Scientific Design Company, Inc., New York, N.Y., a corporation of Delaware
No Drawing. Filed Oct. 2, 1958, Ser. No. 764,760
9 Claims. (Cl. 260—683.15)

This invention is concerned with processes for the polymerization of olefins. More particularly, this invention is concerned with processes for the dimerization of propylene to produce $C_6$ olefins. Specifically, this invention is concerned with methods for improving the rate of conversion of propylene in processes for the production of $C_6$ olefins.

It is known in the art to polymerize propylene with various catalysts. When the formation of dimer (which comprises $C_6$ olefins) is desired, it has been found that low conversions per pass of propylene at high temperatures give desirable results since the formation of dimer is favored at these conditions. Therefore, to obtain high selectivity to $C_6$ olefins, it is necessary to employ methods which produce minimum conversions of propylene per pass. These methods require large reaction systems and, as a result of low conversion per pass, large amounts of unreacted propylene result and a maximum recycle of this propylene is required in order to obtain the desired $C_6$ olefin yield. As a result, separations must be made in such processes to remove the unreacted propylene from the products, for recycle to the reactor.

It has been found that the conversion of propylene to polymer for a fixed amount of catalyst charge is affected by the flow rate, and that as the flow rate is increased the conversion of propylene correspondingly decreases.

It is a feature of the present invention to provide a method for maintaining a desired conversion while increasing the flow rate of propylene. Alternatively, the conversion can be increased while maintaining the same flow rate. Utilization of the present invention makes it possible to produce approximately twice as much product in the same amount of time in a given reactor.

It is another feature of the present invention to reduce the size of the reaction system necessary to produce a desired amount of product.

It is a further feature to minimize the recycle of propylene necessary to produce a desired amount of dimer and to reduce the need for separation and purification systems for the removal of propylene.

It is another feature of the invention to increase the conversion of propylene to polymer by contacting propylene in the vapor phase in the presence of water with an acidic clay catalyst, desirably a natural or synthetic zeolitic catalyst and preferably a neutralized (as hereinafter described) silica-alumina catalyst, the ratio of propylene to water in the reactant feed being in the range of from about 30:1 to 2.5:1. The water may be added as a vapor or as a liquid, and it is intended that the present invention embody either method of addition to the propylene feed. As used herein, the term "zeolitic" is used to embrace both the natural and synthetic acidic material, particularly clays, exhibiting ion exchange characteristics.

It has been found that the amount of water present in the reaction feed is important in producing this increased conversion. When an excessive amount of water is present, the rate of conversion decreases. If the amount of water present in the propylene feed is too small, its full effect is not realized.

Another feature of the present invention is in a process for the polymerization of propylene comprising contacting propylene in the vapor phase with a nautral or synthetic zeolitic catalyst, the step of contacting said propylene with said catalyst in the presence of water, the weight ratio of propylene to water being in the range of from approximately 2.5:1 to 30:1.

Still another feature of the present invention is in a process for the production of propylene dimer, comprising contacting propylene with a neutralized silica-alumina catalyst at a temperature in the range of from about 550 to 1000° F. at super-atmospheric pressure at an hourly space velocity of from approximately 550 to 330, the step of contacting said propylene with said catalyst in the presence of water, the weight ratio of propylene to water being in the range of from approximately 2.5:1 to 30:1.

In a preferred embodiment of the invention, propylene is contacted in the presence of water with a neutralized silica-alumina catalyst at a temperature in the range of from about 550 to 1000° F. at superatmospheric pressure at an hourly space velocity of from approximately 550 to 3300, the weight ratio of propylene to water being in the range of from approximately 2.5:1 to 30:1.

In order to facilitate a clear understanding of the invention, the following preferred specific embodiments are described in detail.

The below indicated propylene feeds, with or without the addition of water in the amounts indicated, are passed into a stainless steel reactor and contacted with 100 parts of neutralized silica-alumina catalyst. Both propylene and water feeds are given in parts by weight per 100 parts by weight of catalyst. Polymerization is carried out at a temperature of approximately 850° F. and the pressure is maintained at approximately 50 p.s.i.g. $C_6$ olefins are produced and there are obtained the conversions and selectivities indicated in Table I below. As used herein, percent conversion means mols of propylene consumed per 100 mols of propylene feed, and percent selectivity means mols of $C_3$ olefins converted to dimer per 100 mols of propylene consumed.

TABLE I

| Example | Propylene, Feed/hr. | Water/hr. added to Propylene Feed | Ratio of Propylene/Water | Hourly Space Velocity | Percent Conversion | Percent Selectivity |
|---|---|---|---|---|---|---|
| 1 | 593 | 0 | -------- | 1,593 | 7.6 | 70.9 |
| 2 | 548 | 40 | 13.7 | 1,469 | 17 | 49.2 |
| 3 | 1,084 | 38 | 28.6 | 2,900 | 8.6 | 71.9 |
| 4 | 562 | 250 | 2.3 | 1,502 | 7.6 | 76.0 |
| 5 | 560 | 10 | 56.1 | 1,500 | 12 | 60.0 |
| 6 | 1,084 | 0 | 0 | 2,900 | 3.2 | 84.3 |
| 7¹ | 562 | 0 | 0 | 1,500 | 3.5 | 83.1 |

¹ $N_2$ diluent utilized—one volume diluent per volume propylene feed.

Example 1 demonstrates that at the flow rate of propylene indicated and in the absence of water, 7.6% of the propylene will be converted with a selectivity of dimer ($C_6$ olefins) of 70.9%.

Example 2 demonstrates that at approximately the same flow rate the conversion may be approximately doubled when the water is added to the propylene feed in a ratio of approximately 1 part of water to 13.7 parts of propylene.

It has been heretofore mentioned that the conversion of propylene to polymer is affected by the flow rate of propylene feed, for a fixed amount of catalyst charge, and that at higher flow rates, lower conversions are obtained.

By comparing Example 3 with Example 1, it is demonstrated, however, that the conversion of propylene may be maintained at the same rate, even if the flow rate is approximately doubled, by the addition of water to the propylene feed.

Example 4 demonstrates that when the amount of water present in the propylene feed is excessive, the conversion of propylene is not increased. Comparing Example 4 with Example 2, it can be seen that the addition of water in the proper amount more than doubled the conversion (Example 2) but that, when an excessive amount of water is used (Example 4), the conversion is the same as when no water is present (Example 1).

By comparing Example 6 with Example 3 it is demonstrated that; while maintaining the same flow rate and eliminating water the percent conversion drops even through the selectivity increases. Further, comparing Examples 4 and 7 it is demonstrated that under comparable conditions elimination of water in the reaction results in decrease of the percent conversion even though the selectivity rises.

Example 5 demonstrates that if too small an amount of water is present in the propylene feed, the expected increase in conversion is minimized.

It has been found, as a feature of the present invention, that alcohols such as, for example, methanol, ethanol, isopropanol, and the like can be utilized in place of water as aforedescribed to yield comparable results, as set forth in Example 6.

*Example 8*

The procedure of Example 1 is repeated using 92 parts of methanol (instead of water) which is added to 538 parts of propylene. 13% of the propylene is converted with a 35% selectivity to dimer.

The foregoing example demonstrates that said alcohols, such as methanol, can be utilized to increase the conversion of propylene in the same manner as if water was added directly to the propylene feed.

*Example 9*

The procedure of Example 1 is repeated at an hourly space velocity of 600 using an hourly propylene feed of 260 grams to which 25 grams of water are added. A 32% conversion is obtained with a 41% selectivity to dimer.

The amount of water which should be present in the propylene feed in order to increase the conversion is broadly 1 part of water to 2.5 to 30 parts of propylene, preferably 1 part of water to 3 to 15 parts of propylene, and desirably 1 part of water to 3.5 to 6 parts of propylene.

The reaction temperature for the polymerization is broadly 550 to 1000° F. and desirably between 750 to 850° F.

The pressure utilized is broadly atmospheric up to several atmospheres, preferably 25 to 250 p.s.i.g. and desirably 50 to 75 p.s.i.g.

The hourly space velocity is broadly 550 to 3300, preferably 700 to 950, and desirably 850.

The term "hourly space velocity" means volumes of propylene/volume of catalyst/hour at which the volumes are measured at standard temperature and pressure.

The preferred neutralized silica-alumina catalyst of the present invention may be prepared by contacting the catalyst with a basic aqueous solution, such as a sodium carbonate or equivalent solution, and washing said catalyst until the washings are neutral.

In view of the foregoing disclosures, variations and modifications will be apparent to one skilled in the art, and it is intended to include within the invention all such variations and modifications except as do not come within the scope of the appended claims.

What is claimed is:

1. A process for the polymerization of propylene, comprising contacting propylene in the vapor phase in the presence of water with an acidic clay catalyst at polymerization conditions, the weight ratio of propylene to water being in the range of from approximately 2.5:1 to 30:1, said contacting being carried out at a temperature in the range of from about 550° to 1000° F. and at superatmospheric pressure up to about 250 p.s.i.g.

2. A process for the production of propylene dimer, comprising contacting propylene in the presence of water with a neutralized silica-alumina catalyst at a temperature in the range of from about 550 to 1000° F. at superatmospheric pressure up to about 250 p.s.i.g. at an hourly space velocity of from approximately 550 to 3300, the weight ratio of propylene to water being in the range of from approximately 2.5:1 to 30:1.

3. The process of claim 2 wherein said neutralized catalyst is prepared by contacting a silica-alumina catalyst with a basic aqueous solution and washing said catalyst until the washings are neutral.

4. In a process for the production of propylene dimer, comprising contacting propylene with a neutralized silica-alumina catalyst at a temperature in the range of from about 550 to 1000° F. at superatmospheric pressure up to about 250 p.s.i.g. at an hourly space velocity of from approximately 550 to 3300, the step of contacting said propylene with said catalyst in the presence of water, the weight ratio of propylene to water being in the range of from approximately 2.5:1 to 30:1.

5. A process for the production of propylene dimer, comprising contacting propylene in the presence of water with a neutralized silica alumina catalyst at a temperature in the range of from about 550° F. to 1000° F. at superatmospheric pressure up to about 250 p.s.i.g. at an hourly space velocity of from approximately 550 to 3300, the weight ratio of propylene to water being in the range of from approximately 3:1 to 15:1.

6. A process for the production of propylene dimer, comprising contacting propylene in the presence of water with a neutralized silica-alumina catalyst at a temperature in the range of from about 550 to 1000° F. at superatmospheric pressure up to about 250 p.s.i.g. at an hourly space velocity of from approximately 550 to 3300, the weight ratio of propylene to water being in the range of from approximately 3.5:1 to 6:1.

7. A process for the polymerization of propylene, comprising contacting propylene in the vapor phase in the presence of water with a zeolitic catalyst at a temperature in the range of from about 550° to 1000° F. and at superatmospheric pressure up to about 250 p.s.i.g., the weight ratio of propylene to water being in the range of from approximately 2.5:1 to 30:1.

8. A process for the polymerization of propylene, comprising contacting propylene in the vapor phase in the presence of water with a neutralized silica-alumina catalyst at a temperature in the range of from about 550° to 1000° F. and at superatmospheric pressure up to about 250 p.s.i.g., the weight ratio of propylene to water being in the range of from approximately 2.5:1 to 30:1.

9. The process of claim 8 wherein said neutralized catalyst is prepared by contacting a silica-alumina catalyst with a basic aqueous solution and washing said catalyst until the washings are neutral.

References Cited in the file of this patent

UNITED STATES PATENTS

| | | |
|---|---|---|
| 2,507,864 | Moore et al. | May 16, 1950 |
| 2,574,895 | Stecker | Nov. 13, 1951 |
| 2,617,839 | Moore et al. | Nov. 11, 1952 |
| 2,827,500 | Bloecher et al. | Mar. 18, 1958 |

UNITED STATES PATENT OFFICE

CERTIFICATE OF CORRECTION

Patent No. 3,047,644     July 31, 1962

Charles N. Winnick

It is hereby certified that error appears in the above numbered patent requiring correction and that the said Letters Patent should read as corrected below.

Column 2, line 8, for "330" read -- 3300 --.

Signed and sealed this 13th day of November 1962.

(SEAL)
Attest:

ERNEST W. SWIDER
Attesting Officer

DAVID L. LADD
Commissioner of Patents